Oct. 2, 1962   E. COHEN ET AL   3,056,895
ELECTROMAGNETIC COUPLING
Filed Sept. 19, 1958

Elie Cohen
Szymon Roth
INVENTORS

BY   *Karl G. Ross*
AGENT.

United States Patent Office 3,056,895
Patented Oct. 2, 1962

3,056,895
ELECTROMAGNETIC COUPLING
Elie Cohen, 89 Rue Bobillot, Paris 13, France, and Szymon Roth, 18 Blvd. Barbes, Paris 18, France
Filed Sept. 19, 1958, Ser. No. 762,131
Claims priority, application France Dec. 17, 1957
4 Claims. (Cl. 310—96)

The present invention relates to improvements in excitation means for electromagnetic apparatus, such as couplings, and more particularly eddy-current couplings, especially those of the type including a rotating excitation winding.

A type of eddy-current coupling is known wherein the magnetic circuit carrying the excitation winding of the coupling, and the armature of the generator supplying voltage to said winding, are secured for bodily rotation upon a common shaft of the coupling, connecting means being provided whereby a permanent closed-circuit electric connection is present between the said winding and said armature. The generator supplying the excitation winding of the coupling with direct-current energy comprises a permanent magnet and a rotating armature wound as a single-phase or poly-phase alternator, and the connecting means between said winding and armature include at least one dry rectifier carried by the rotor of the coupling.

Couplings of this type are used as clutches and, for this purpose, the permanent magnet is axially shiftable with respect to the armature through manual action on a lever which thus provides a progressive clutch control.

The object of the present invention, on the other hand, is to provide a variable-slippage coupling whereby the speed of the coupling can be controlled from a remote point, thereby providing a variable-speed drive wherein the permanent operating speed can be varied at will.

According to the invention, the field of the generator, supplying current to the excitation winding of the coupling, consists of a winding connected in a circuit including means for varying the strength of the current flow through this circuit at will.

Another improvement of the invention resides in the provision, laterally on the rotor carrying the excitation winding of the coupling, of ventilating fan blades or fins forcing the air to flow axially through teeth or notches formed peripherally of the rotor, and through the space defined between the said rotor and the other coupling rotor coaxial with it.

According to yet another improvement, the outer rotor surrounding the rotor which carries the excitation winding of the coupling is provided with radial cooling fins forcing the air to flow along the inner wall surface of the stator.

Figure 1:
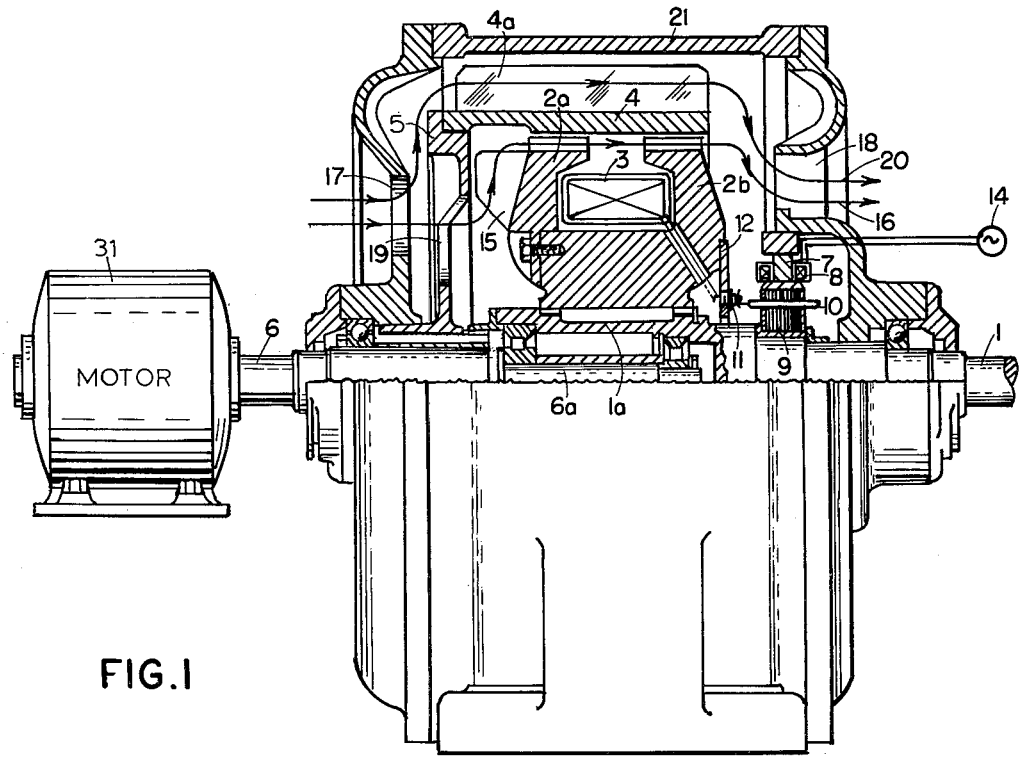
Figure 2:
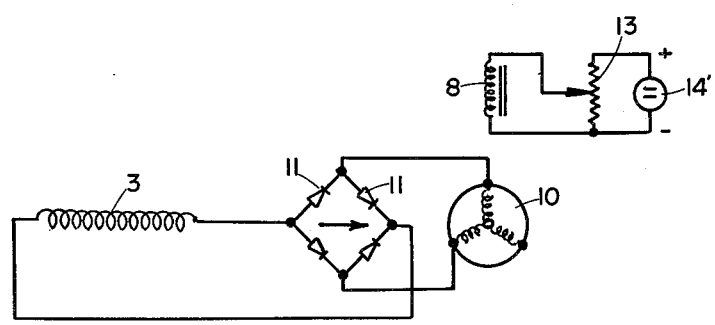

In the accompanying drawing:

FIG. 1 is an elevational view, with the upper half in axial section, of an improved coupling according to the invention; and FIG. 2 is an electric circuit diagram illustrating the connections between the various windings in an alternate coupling.

In the embodiment illustrated in FIG. 1 of the attached drawing, the reference 1 designates one of the shafts of the coupling, having a recessed inner end section 1a which carries the two part 2a and 2b of an inner rotor around which the excitation winding 3 of the coupling is carried.

The inner rotor is formed with teeth and notches around its outer periphery. This periphery is surrounded by an outer rotor 4 formed with radially extending cooling fins or blades 4a on its outer periphery. This outer rotor is supported from an end flange 5 having its hub secured on the other shaft 6 of the coupling, coaxially aligned with the shaft 1—1a. The inner end 6a of shaft 6 is journaled in bearings within the recessed section 1a of shaft 1; this shaft is powered by a motor 31 to act as the drive shaft of the system.

The energizing winding 3 of the coupling is supplied with D.-C. energy from a generator which is housed in the right-end part of the coupling assembly coaxially with it. This generator includes a stator 7 supported in the right-end flange of the coupling unit, which stator is formed with poles similar to conventional A.-C.-generator poles, around which field windings 8 are wound. An armature 9 is secured on the shaft 1 within the stator and comprises a stack of magnetic laminations formed with notches in which conductors are received to provide an armature winding 10 similar to the conventional armature winding of a one-phase or polyphase A.-C. generator.

The winding 3 is supplied with D.-C. energy from the generator armature 10, being connected thereto through a set of four rectifier cells 11, preferably dry rectifier cells of the germanium or silicon type. As shown in FIG. 2, the rectifiers are connected in a full-wave bridge circuit here shown as connected across two phases of a three-phase generator winding. The rectifier cells 11 are supported from a plate 12, preferably made of copper, which in turn is secured to one end of the part 2b of the inner coupling rotor. Since the generator armature, the rectifier cells and the coupling winding are bodily revolving at a common speed, the electrical connections between these components can be provided in a simple closed circuit and the winding will be supplied with D.-C. energy without requiring collector rings and brushes or similar sliding connection devices.

For controlling the current through winding 3, it is simply necessary to adjust the field-excitation current in the A.-C. generator. For this purpose the field windings 8 are connected by way of an adjusting potentiometer 13 across an alternating-current source 14 which may be the power network supplying the motor 31. It will readily be understood that any variation in the potentiometer setting will modify the current induced in winding 10 and hence the current flowing through winding 3.

Since the power required for the excitation of the alternator only represents a small fraction of the power taken up by the coupling winding, the associated control equipment required can be much simpler than in conventional systems of this kind.

In the system of FIG. 1, in which the source 14 is an alternating source, the armature windings 10 will supply one-phase current at the same frequency as that of the source to the rectifier bridge 11 feeding the winding 3.

It should be noted that if the field 8 were excited with direct current, as illustrated at 14′ in FIG. 2, the motor 31 would have to be secured to the shaft 1 instead of shaft 6.

In all cases the drive power for the generator is derived from the motor used to drive the coupling.

According to another improvement applicable to this particular type of coupling, ventilation blades 15 are provided on the end surface of the portion 2a of the inner rotor, forcing air to flow along the path indicated by arrow 16 between the inner and outer rotors, through openings 17 and 18 formed in the flanges of the coupling stator and an aperture 19 formed in the flange 5.

Simultaneously air flow occurs by way of the path indicated by arrows 20 between outer rotor 4 and cylindrical stator 21. Under such conditions the coupling is efficiently cooled throughout all the parts thereof liable to heating.

What we claim is:

1. In an electromagnetic coupling, in combination, a pair of aligned shafts including a drive shaft and a driven shaft, a first rotor on said driven shaft, a second rotor on said drive shaft closely spaced from said first rotor, coupling means on said rotors for electromagnetically entraining one by the other, said coupling means including an energizing winding on said first rotor, and generator means for supplying direct current to said winding; said generator means comprising an armature winding on said driven shaft, a stationary field winding surrounding said armature winding, circuit means for supplying alternating current to said field winding, control means included in said circuit means for varying the magnitude of the alternating current supplied by said circuit means to said field winding, a conductive connection extending from said armature winding to said energizing winding, and rectifier means in said connection mounted on said driven shaft at a distance from its axis less than the radius of said field winding.

2. The combination according to claim 1 wherein said armature winding consists of a plurality of coils wound in a polyphase array, said rectifier means including a full-wave bridge connected across two of said coils adapted to have out-of-phase currents induced therein.

3. The combination according to claim 1 wherein said second rotor surrounds said first rotor.

4. In an electromagnetic coupling, in combination, a pair of aligned shafts including a drive shaft and a driven shaft, a first rotor on said driven shaft, a second rotor on said drive shaft closely spaced from said first rotor, coupling means on said rotors for electromagnetically entraining one by the other, said coupling means including an energizing winding on said first rotor, and generator means for supplying direct current to said winding; said generator means comprising an armature winding on said driven shaft, a stationary field winding surrounding said armature winding, circuit means for supplying alternating current to said field winding, a conductive connection extending from said armature winding to said energizing winding, and rectifier means in said connection.

References Cited in the file of this patent
UNITED STATES PATENTS

| | | |
|---|---|---|
| 2,479,989 | Winther | Aug. 23, 1949 |
| 2,484,138 | Winther | Oct. 11, 1949 |
| 2,539,569 | Clark | Jan. 30, 1951 |